United States Patent
Wei et al.

(10) Patent No.: US 7,750,549 B2
(45) Date of Patent: Jul. 6, 2010

(54) FIELD EMISSION LAMP

(75) Inventors: Yang Wei, Beijing (CN); Peng Liu, Beijing (CN); Lei-Mei Sheng, Beijing (CN); Liang Liu, Beijing (CN); Zhao-Fu Hu, Beijing (CN); Cai-Lin Guo, Beijing (CN); Pi-Jin Chen, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 730 days.

(21) Appl. No.: 11/169,137

(22) Filed: Jun. 28, 2005

(65) Prior Publication Data

US 2006/0017370 A1 Jan. 26, 2006

(30) Foreign Application Priority Data

Jul. 20, 2004 (CN) .................. 2004 1 0050819

(51) Int. Cl.
*H01J 63/02* (2006.01)
(52) U.S. Cl. ....................... 313/496; 313/355
(58) Field of Classification Search ......... 313/308–311, 313/336, 351, 495–497, 422, 306, 355; 445/49–51
See application file for complete search history.

(56) References Cited

U.S. PATENT DOCUMENTS

| | | | | |
|---|---|---|---|---|
| 1,925,054 A | * | 8/1933 | McMaster | .................. 313/541 |
| 2,898,500 A | * | 8/1959 | Landrey | ..................... 313/521 |
| 4,314,178 A | * | 2/1982 | Matsuoka et al. | ........... 313/497 |
| 4,506,194 A | * | 3/1985 | Rigden et al. | ........... 315/200 R |
| 4,737,683 A | * | 4/1988 | Shichao et al. | .............. 313/495 |
| 6,741,025 B2 | * | 5/2004 | Tuck et al. | .................. 313/495 |
| 2002/0070648 A1 | * | 6/2002 | Forsberg | ..................... 313/309 |
| 2006/0006789 A1 | * | 1/2006 | Itoh et al. | ................... 313/497 |

OTHER PUBLICATIONS

Microelectronic, Apr. 2004, Elsevier, Croci.*
Mirko Croci, Imad Arfaoui, Thomas Stockli, Andre Chatelain, Jean-Marc Bonard; a Full Sealed Luminescent Tube Based on Carbon Nanotube Field Emission; pp. 329-336, vol. 35, Microelectronics Journal.

* cited by examiner

*Primary Examiner*—Joseph L. Williams
*Assistant Examiner*—Fatima N Farokhrooz
(74) *Attorney, Agent, or Firm*—D. Austin Bonderer

(57) ABSTRACT

A field emission lamp (30) includes a tube (31) having a closed end and an open end, an encapsulation board (38) mated with the open end, an anode layer (32) formed on an inner surface, a fluorescence layer (33) formed on the anode layer, a cathode down-lead pole (342) located at the encapsulation board, a cathode fixing pole (341) located at the closed end, a cathode filament (34) having a carbon nanotube layer formed on a surface thereof fixed between the cathode down-lead pole and the cathode fixing pole, an anode down-lead ring (321) located at the anode layer near the open end, and an anode down-lead pole (322) located at the encapsulation board and electrically connected with the anode down-lead ring. The field emission lamp has a simple structure, thereby having an enhanced production rate and a reduced cost.

20 Claims, 1 Drawing Sheet

FIELD EMISSION LAMP

BACKGROUND OF THE INVENTION

The invention relates generally to lamps, and more particularly to a field emission lamp.

Lamps are virtual necessities in modern daily living, and a conventional luminescent lamp generally adopts mercury vapor. In use, electrons are accelerated by an electric field so that the accelerated electrons collide with the mercury vapor. This causes excitation of the mercury vapor and subsequent remission. The remission process causes radiation of ultraviolet rays. The ultraviolet rays irradiate a fluorescent material of the lamp, whereby the ultraviolet rays are converted into visible light.

However, the mercury vapor is toxic to humans and environmentally unsafe. Therefore in recent years, field emission lamps which adopt carbon nanotubes as emitters have been manufactured to replace conventional luminescent lamps.

Referring to FIG. 2, a field emission lamp as disclosed in an article entitled "A Full Sealed Luminescent Tube Based on Carbon Nanotube Field Emission" and authored by Mirko Croci. et al (page 329-336, Vol. 35, Microelectronics Journal 2004) is shown. The field emission lamp 20 includes: a glass tube 21 open at two ends thereof, and having a plurality of feedthroughs 211, 212, 213, 214 formed therealong; a conductive layer 22 formed on an inner surface of the glass tube 21; a phosphor layer 23 formed on the conductive layer 22; a first endpiece 27 and a second endpiece 28 mated with the open ends of the glass tube 21 respectively; a cathode fixing pole 241 located at the first endpiece 27; a cathode down-lead pole 242 located at the second endpiece 28; and a cathode 24 fixed between the cathode fixing pole 241 and the cathode down-lead pole 242. The cathode 24 has a carbon nanotube layer (not shown) formed on a surface thereof. Furthermore, a spring 243 is fixed between the cathode 24 and the cathode down-lead pole 242, a conductive annular ring 25 is formed on the inner surface of the glass tube 20 at opposite ends of the conductive layer 22 and the phosphor layer 23, a plurality of getters 29 are located at the first endpiece 27 and connected with the feedthroughs 211, 213, and a pumping stem 26 is located at the second endpiece 28. The conductive annular ring 25 is electrically connected with an anode (not shown) via the feedthroughs 212, 214. The pumping stem 26 is sealed after evacuation of the field emission lamp 20, and the getters 29 are used to absorb residual gas in the glass tube 21.

In use, the anode is grounded, and an appropriate negative voltage is applied to the cathode down-lead pole 242, thereby forming a strong field along the surface of the cathode 24. The strong field excites the carbon nanotubes on the surface of the cathode 24 to emit electrons, and the electrons bombard the phosphor layer 23 on the inner surface of the glass tube 20, thereby producing visible light.

The field emission lamp 20 does not use mercury vapor, and is safe for humans and environmentally friendly. Furthermore, the field emission lamp 20 adopts a cold cathode, thereby providing a high electrical energy utilization ratio and low energy consumption. However, the field emission lamp 20 has the two ends that need to be encapsulated, and each encapsulation procedure is complicated and time-consuming. This means that the field emission lamp has a relatively high cost.

What is needed, therefore, is a field emission lamp having a simple structure and low cost.

SUMMARY

In a preferred embodiment, a field emission lamp includes a tube having a closed end and an open end, an encapsulation board mated with the open end of the tube, an anode layer formed on an inner surface of the tube, a fluorescence layer formed on the anode layer, a cathode down-lead pole located at the encapsulation board, a cathode fixing pole located at the closed end of the tube, a cathode filament having a carbon nanotube layer formed on a surface thereof fixed between the cathode down-lead pole and the cathode fixing pole, an anode down-lead ring located at the anode layer near the open end of the tube, and an anode down-lead pole located at the encapsulation board and electrically connected with the anode down-lead ring.

Compared with a conventional field emission lamp, the field emission lamp of the preferred embodiment has only one end that needs to be encapsulated. This effectively simplifies the encapsulation procedure during the manufacturing process, thereby enhancing a production rate and reducing the cost of the field emission lamp.

Other advantages and novel features will become more apparent from the following detailed description of preferred embodiments when taken in conjunction with the accompanying drawings, in which:

DETAILED DESCRIPTION OF PREFERRED EMBODIMENTS

Figure 1:
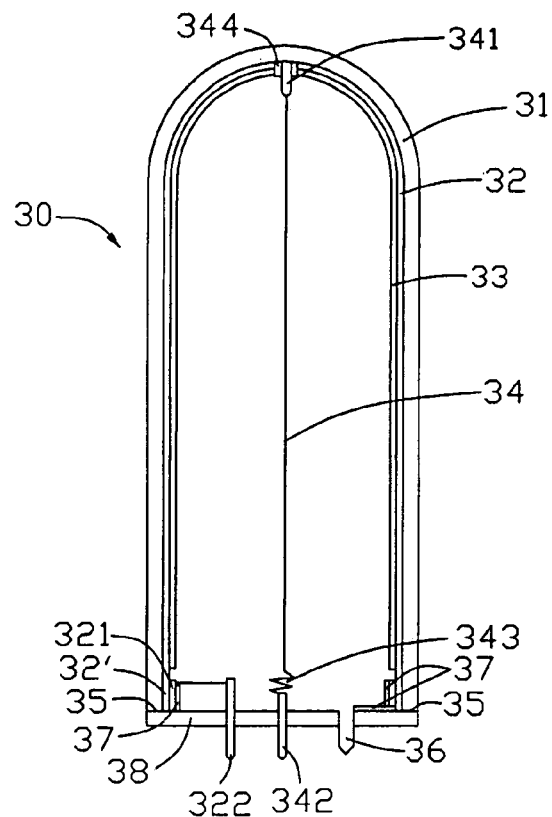
FIG. 1 is a schematic, cross-sectional view of a field emission lamp in accordance with a preferred embodiment of the present invention.
Figure 2:
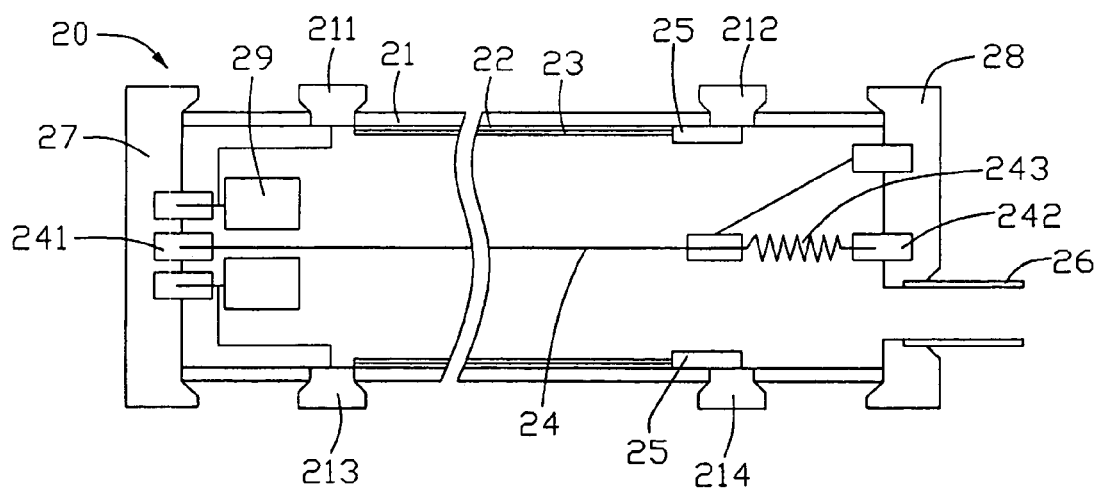
FIG. 2 is a schematic, abbreviated cross-sectional view of a conventional field emission lamp.

Reference will now be made to FIG. 1 to describe preferred embodiments of the present invention in detail.

A field emission lamp 30 includes: an enclosure of the lamp 30 like a tube 31 having a closed end (not labeled) and an open end (not labeled); a board-like encapsulation part 38 mated with the open end of the tube 31; an anode part 32 having a layer-like shape formed on an inner surface (not labeled) of the tube 31; a fluorescence layer 33 formed on the anode layer 32; a cathode down-lead pole 342 located at the encapsulation board 38 and protruding from opposite main surfaces (not labeled) of the encapsulation board 38; a cathode fixing pole 341 located at the closed end of the tube 31; a cathode part 34 with a filament shape having a carbon nanotube layer (not shown) formed on a surface (not labeled) thereof, and being fixed between the cathode down-lead pole 342 and the cathode fixing pole 341; an anode down-lead ring 321 located at the anode layer 32 near the open end of the tube 31; and an anode down-lead pole 322 located at the encapsulation board 38. The anode down-lead pole 322 protrudes from the opposite main surfaces of the encapsulation board 38, and is electrically connected with the anode down-lead ring 321.

The tube 31 of the field emission lamp 30 is made of glass. A diameter of the tube 31 is in the range from 2 to 40 millimeters, and a length of the tube 31 can be determined according to actual need. The closed end of the tube 31 is hemispherical, and the cathode fixing pole 341 is fixed in a middle of the closed end via an electrically and thermally insulative medium 344.

The anode layer 32 can be an Indium Tin Oxide (ITO) film, and the fluorescence layer 33 can be white or colored. A portion 32' of the anode layer 32 near the open end of the tube 31 is not covered by the fluorescence layer 33, and the anode down-lead ring 321 is located at and electrically engaged with the portion 32'. Therefore, because the anode down-lead pole 322 is electrically connected with the anode down-lead ring 321, the anode down-lead pole 322 is thereby electrically connected with the anode layer 32.

The cathode filament 34 is made of a wire, and a diameter thereof is greater than 0.3 millimeters. The carbon nanotube layer is formed on the surface of the cathode filament 34 by means of Chemical Vapor Deposition (CVD) or electrophoretic deposition. Furthermore, a spring 343 is fixed between the cathode filament 34 and the cathode down-lead pole 342. When the field emission lamp 30 is switched on or off, the cathode filament 34 expands on heating or contracts on cooling, and the spring 343 is used to compensate for such changes of the cathode filament 34.

The encapsulation board 38 is made of electrically and thermally insulative material, and is mated with the open end of the tube 31 via an electrically and thermally insulative glass layer 35. The field emission lamp 30 further includes a vent-pipe 36 extending through the encapsulation board 38, and a plurality of getters 37 formed on the encapsulation board 38 and the anode down-lead ring 321 by means of high frequency evaporation. The vent-pipe 36 is connected with an external vacuum pump (not shown), and is used to vacuumize the field emission lamp 30. The getters 37 are conductive films, and are used to absorb residual gas in the field emission lamp 30. The getters 37 are positioned to not cover the fluorescence layer 33, and to not cause a short circuit between the cathode down-lead pole 342 and the anode down-lead pole 322.

In use, the anode down-lead pole 322 is grounded, and an appropriate negative voltage is applied to the cathode down-lead pole 342, thereby forming a strong field along the surface of the cathode filament 34. The strong field excites the carbon nanotubes on the surface of the cathode 34 to emit electrons, and the electrons bombard the fluorescence layer 33, thereby producing visible light.

Compared with a conventional field emission lamp, the field emission lamp of the preferred embodiment has only one end that needs to be encapsulated. This effectively simplifies the encapsulation procedure during the manufacturing process, thereby enhancing a production rate and reducing the cost of the field emission lamp.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A field emission lamp comprising:
   a tube having a closed end and an open end;
   an anode layer substantially covering an entire inner surface of the tube;
   a fluorescence layer located on the anode layer including at least part of the anode layer corresponding to the closed end;
   an encapsulation board mated with the open end of the tube;
   a cathode down-lead pole located at the encapsulation board;
   a cathode fixing pole fixed at the closed end of the tube, and the cathode fixing pole is insulated by the surrounding anode layer;
   a cathode filament fixed between the cathode down-lead pole and the cathode fixing pole, the cathode filament having a carbon nanotube layer located on a surface thereof;
   an anode down-lead ring located at the anode layer adjacent or near the open end of the tube; and
   an anode down-lead pole located at the encapsulation board and electrically connected with the anode down-lead ring.

2. The field emission lamp as claimed in claim 1, wherein the tube is made of glass.

3. The field emission lamp as claimed in claim 1, wherein a diameter of the tube is in the range from 2 to 40 millimeters.

4. The field emission lamp as claimed in claim 1, wherein the cathode filament is made of a wire.

5. The field emission lamp as claimed in claim 1, wherein a diameter of the cathode filament is greater than 0.3 millimeters.

6. The field emission lamp as claimed in claim 1, wherein the anode layer comprises an Indium Tin Oxide (ITO) film.

7. The field emission lamp as claimed in claim 1, wherein the fluorescence layer is white or colored.

8. The field emission lamp as claimed in claim 1, wherein the carbon nanotube layer is located on the surface of the cathode filament by means of Chemical Vapor Deposition (CVD) or electrophoretic deposition.

9. The field emission lamp as claimed in claim 1, wherein the cathode fixing pole is fixed in the closed end via an electrically and thermally insulative medium.

10. The field emission lamp as claimed in claim 1, further comprising a spring fixed between the cathode filament and the cathode down-lead pole.

11. The field emission lamp as claimed in claim 1, further comprising a vent-pipe associated with the encapsulation board.

12. The field emission lamp as claimed in claim 1, further comprising a plurality of getters provided on the encapsulation board and the anode down-lead ring, and the plurality of getters encircles the cathode filament.

13. The field emission lamp as claimed in claim 1, wherein the encapsulation board is mated with the open end of the tube via an electrical and thermally insulative glass layer.

14. The field emission lamp as claimed in claim 1, wherein the cathode fixing pole is fixed in a middle of the closed end.

15. The field emission lamp as claimed in claim 12, wherein the getters comprise conductive films.

16. The field emission lamp as claimed in claim 12, wherein the getters are formed by means of high frequency evaporation.

17. The field emission lamp as clamed in claim 12, wherein the getters are positioned to not cover the fluorescence layer, and to not cause a short circuit between the cathode down-lead pole and the anode down-lead pole.

18. A field emission lamp comprising:
   an enclosure of said field emission lamp having one open end and one close end;
   an anode part substantially covering an entire inner surface of said enclosure and installable into said enclosure exclusively through said one open end, said anode part being electrifiable to be able to emit light substantially from the entire surface of said enclosure;
   a cathode part extending in said enclosure and spaced from said anode part, said cathode part being installable into said enclosure by a cathode fixing pole, the cathode fixing pole fixed at the closed end of the enclosure, the cathode fixing pole is insulated by the surrounding anode part, and said cathode part electrifiable to urge light emission of said anode part, a carbon nanotube layer being located on said cathode part to emit electrons toward said anode part after electrification of said anode and cathode parts so as to urge said light emission of said anode part when said electrons reach said anode part; and an encapsulation part used to seal said one open end of said enclosure after installation of said anode and cathode parts into said enclosure.

19. The field emission lamp as claimed in claim 18, wherein a fluorescence layer is located on said anode part to provide capacity of said anode part for said light emission thereof.

20. A method to manufacture a field emission lamp, comprising the steps of:

providing an enclosure of said field emission lamp having one open end and one closed end;

installing an anode part capable of light emission from substantially entire surface of said enclosure into said enclosure through said one open end;

providing a cathode part, and forming a carbon nanotube layer on said cathode part;

installing said cathode part used to urge said light emission of said anode part into said enclosure through said one open end using a cathode fixing pole, the cathode fixing pole fixed at the closed end of the enclosure, and the cathode fixing pole is insulated by the surrounding anode part;

spacing said cathode part away from said anode part so that said cathode and anode parts are electrifiable for said light emission without physical contact; and sealing said one open end of said enclosure to complete said field emission lamp.

* * * * *